US007251066B2

(12) United States Patent
Chao et al.

(10) Patent No.: US 7,251,066 B2
(45) Date of Patent: Jul. 31, 2007

(54) HOLOGRAPHIC MEMORY USING BEAM STEERING

(75) Inventors: Tien-Hsin Chao, Valencia, CA (US);
Jay C. Hanan, Monrovia, CA (US);
George F. Reyes, Fontana, CA (US);
Hanying Zhou, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/462,495

(22) Filed: Aug. 4, 2006

(65) Prior Publication Data

US 2006/0268380 A1 Nov. 30, 2006

Related U.S. Application Data

(62) Division of application No. 10/824,722, filed on Apr. 15, 2004.

(60) Provisional application No. 60/463,821, filed on Apr. 18, 2003, provisional application No. 60/535,205, filed on Jan. 9, 2004.

(51) Int. Cl.
*G03H 1/26* (2006.01)
(52) U.S. Cl. .............................. 359/22; 359/7; 359/30; 369/103
(58) Field of Classification Search .............. 359/3, 359/7, 22, 29, 30; 365/125; 369/103

See application file for complete search history.

(56) References Cited

U.S. PATENT DOCUMENTS

| 5,959,747 A * | 9/1999 | Psaltis et al. ............. 359/22 |
| 6,088,321 A | 7/2000 | Yamaji et al. |
| 6,172,777 B1 * | 1/2001 | Flood et al. ............... 359/10 |
| 2002/0085250 A1 * | 7/2002 | Kim et al. ................. 359/22 |
| 2004/0090899 A1 | 5/2004 | Gladney et al. |
| 2005/0176947 A1 * | 8/2005 | An et al. ................. 536/23.7 |

OTHER PUBLICATIONS

K.F. Strauss, T. Daud, "Overview of radiation tolerant unlimited write cycle nonvolatile memory", Proceeding of IEEE Aerospace Conference 2000.
W. Schober, F. Lansing, K. Wilson, and E. Webb, "High Data Rate Instrument Study", JPL publication 99-4. Semiconductor memories, A.K. Sharma, IEEE Press, 1996.L.
Hesselink et al, Science vol. 282, P1089, 1998D.
Psaltis et al., Opt. Lett. 24, p652, 1999.
Tien-Hsin Chao, George Reyes, and Youngchul Park, "Grayscale optical correlator." Proceeding of SPIE, Optical Pattern Recognizition IX, Vo. 3386, 1998.
A Mahalanobis, B. V. K. Vijaya Kumar, S. Song, S.R.F. Sims and J.F. Epperson, "Unconstrained correlation Filters," Appl Opt, vol. 33, pp. 3751-3759, (1994).

(Continued)

*Primary Examiner*—Fayez G. Assaf
(74) *Attorney, Agent, or Firm*—Gates & Cooper LLP

(57) ABSTRACT

A method, apparatus, and system provide the ability for storing holograms at high speed. A single laser diode emits a collimated laser beam to both write to and read from a photorefractice crystal. One or more liquid crystal beam steering spatial light modulators (BSSLMs) steer a reference beam, split from the collimated laser beam, at high speed to the photorefractive crystal.

17 Claims, 14 Drawing Sheets

OTHER PUBLICATIONS

Tien-Hsin Chao, George Reyes, and Hanying Zhou, Automatic Target Recognition Field Demonstration Using a Grayscale Optical Correlator. SPIE AeroSense Symposium, Optical Pattern Recognition Conference 3715, pp. 399-406, Orlando, FL (1999).

Hanying Zhou and Tien-hsin Chaor, MACH Filter Syntesizing for Detecting Targets in Cluttered Environment for Grayscale Optical Correlator, SPIE AeroSense Symposium, Optical Pattern Recognition Conference 3715, pp. 394-398, Orlando, FL (1999).

Tien-Hsin Chao, Hanying Zhou, Geroge Reyes, JPL "Compact Holographic Data Storage System,", Proceedings of Eighteenth IEEE Symposium on Mass Storage Systems in cooperation with the Ninth NASA Goddard Conference on Mass Storage Systems and Technologies, Apr. 2001.

T.H. Chao, H Zhou, and G. Reyes, "Advanced compact holographic data storage system," Proceedings of Non-volatile memory technology symposium 2000, pp. 100-105, Nov. 2000.

Tien-Hsin Chao, George Reyes, Hanying Zhou, Danut Dragoi, and Jay Hanan, "High-density Holographic Data Storage," Proceedings of International Symposium on Optical memory 2001, pp. 248-249, Taiwan, Oct. 2001.

Tien-Hsin Chao, George Reyes, Hanying Zhou, Danut Dragoi, and Jay Hanan, "Nonvolatile Rad-Hard Holographic Memory," Proceedings of Non-volatile memory technology Symposium 2001, pp. 12-17, San Diego, CA, Nov. 2001.

Tien-Hsin Chao, "Advanced Holographic Memory_AIST-99-0057_Final Report" Prepared for NASA ESTO AIST, Nov. 2002.

* cited by examiner

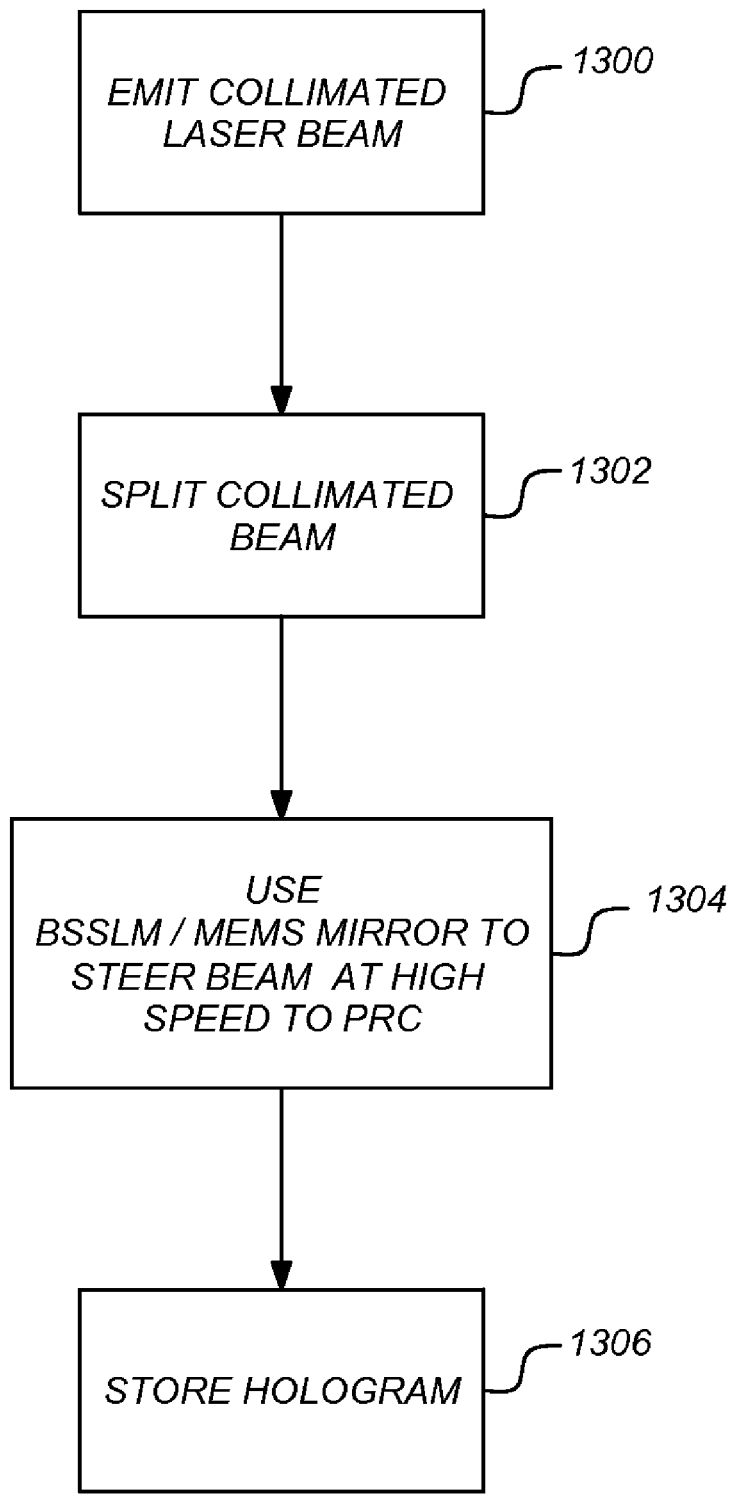

ent application, which is incorporated
HOLOGRAPHIC MEMORY USING BEAM STEERING

CROSS-REFERENCE TO RELATED APPLICATIONS

This application claims the benefit under 35 U.S.C. Section 120 of the following co-pending and commonly-assigned U.S. utility patby reference herein:

Utility application Ser. No. 10/824,722, filed Apr. 15, 2004, by Tien-Hsin Chao, Jay C. Hanan, George F. Reyes, and Hanying Zhou, entitled HOLOGRAPHIC MEMORY USING BEAM STEERING, which application claims the benefit under 35 U.S.C. Section 119(e) of the following co-pending and commonly-assigned U.S. provisional patent application(s), which is/are incorporated by reference herein:

Provisional Application Ser. No. 60/463,821, filed on Apr. 18, 2003, by Tien-Hsin Chao, Hanying Zhou, and George F. Reyes, entitled "COMPACT HOLOGRAPHIC DATA STORAGE SYSTEM," and Provisional Application Ser. No. 60/535,205, filed on Jan. 9, 2004, by Tien-Hsin Chao, Jay C. Hanan, and George F. Reyes, entitled "HIGH DENSITY HIGH RATE HOLOGRAPHIC MEMORY USING A MEMS MIRROR BEAM STEERING DEVICE."

STATEMENT REGARDING FEDERALLY SPONSORED RESEARCH AND DEVELOPMENT

The invention was made with Government support under Grant No. NAS7-1407 awarded by NASA. The Government has certain rights in this invention.

BACKGROUND OF THE INVENTION

1. Field of the Invention

The present invention relates generally to holography, and in particular, to a holographic memory system using a mirror beam steering device

2. Description of the Related Art

Many devices (e.g., compact discs and digital video discs) use light to store and read data. However, prior art optical storage methods have limited transfer and capacity capabilities. To overcome the disadvantages of the prior art, holographic memory may be used. Holographic memory stores information beneath the surface of the recording medium and uses the volume of the recording medium for storage. However, holographic memory may also have speed limitations with respect to recording data and/or reading the data from the storage medium. These problems may be better understood by describing the future needs for memory and prior art holographic memory systems.

Current technology, as driven by the personal computer and commercial electronics market, is focusing on the development of various incarnations of Static Random Access Memory (SRAM), Dynamic Random Access Memory (DRAM), and Flash memories. Both DRAM and SRAM are volatile. Their densities are approaching 256 Mbits per die. Advanced 3-D multichip module (MCM) packaging technology has been used to develop solid-state recorder (SSR) with storage capacity of up to 100 Gbs. The flash memory, being non-volatile, is rapidly gaining popularity. Densities of flash memory of 256 Mbits per die exist in the prior art. High density SSR could also be developed using the 3-D MCM technology. However, flash memory is presently faced with two insurmountable limitations: limited endurance (breakdown after repeated read/write cycles), and poor radiation-resistance (due to simplification in power circuitry for ultra-high density package).

NASA's future missions may require massive high-speed onboard data storage capability to support Earth Science missions. With regard to Earth science observation, a 1999 joint Jet Propulsion Laboratory and Goddard Space Flight Center (GFSC) study ("The High Data Rate Instrument Study") has pointed out that the onboard science data (collected by high date rate instruments such as hyperspectral and synthetic aperture radar) stored between downlinks would be up to 40 terabits (Tb) by 2003. However, onboard storage capability in 2003 is estimated at only 4 Tb that is only 10% of the requirement. By 2006, the storage capability is likely to fall further behind and supporting merely 1% of the onboard storage requirements.

Accordingly, prior art electronic memory cannot satisfy all NASA mission needs. Thus, what is needed is a new memory technology that would simultaneously satisfy nonvolatility, rad-hard, long endurance as well as high density, high transfer rate, low power, mass and volume to meet all NASA mission needs.

Volume holography has been predominantly considered as a high-density data storage technology. With volume holography, the volume of the recording medium is utilized for storage instead of only utilizing the surface area (such as with compact discs [CDs] and/or digital video discs [DVDs]). Traditionally, when a laser is fired, a beam splitter is utilized to create two beams. One beam, referred to as the object or signal beam/wavefront travels through a spatial light modulator (SLM) that shows pages of raw binary data as clear and dark boxes. The information from the page of binary code is carried by the signal beam to a light-sensitive lithium-niobate crystal (or any other holographic materials such as a photopolymer in place of the crystal). The second beam (produced by the beam splitter), called the reference beam, proceeds through a separate path to the crystal. When the two beams meet, the interference pattern that is created stores the data carried by the signal beam in a specific area in the crystal as a hologram (also referred to as a holographic grating).

Depending on the angle of the reference beam used to store the data, various pages of data may be stored in the same area of the crystal. To retrieve data stored in the crystal, the reference beam is projected into the crystal at exactly the same angle at which it entered to store that page of data. If the reference beam is not projected at exactly the same angle, the page retrieval may fail. The beam is diffracted by the crystal thereby allowing the recreation of the page that was stored at the particular location. The recreated page may then be projected onto a charge-coupled device (e.g., CCD camera), that may interpret and forward the data to a computer.

Thus, as described above, a complex data-encoded signal wavefront is recorded inside a media as sophisticated holographic gratings by interference with a selective coherent reference beam. The signal wavefront is recovered later by reading out with the same corresponding reference beam.

Bragg's law determines that the diffracted light intensity is significant only when the diffracted light is spatially coherent and constructively in phase. Bragg's law is often used to explain the interference pattern of beams scattered by crystals. Due to the highly spatial and wavelength Bragg selectivity of a crystal, a large number of holograms can be stored and read out selectively in the same volume. Accordingly, there is a potential for one bit per wavelength cube data storage volume density and intrinsic parallelism of data accessing up to Mbytes per hologram.

Accordingly, as described above, the prior art fails to provide sufficient memory capabilities. Prior art holographic memory systems have evolved in an attempt to provide such capabilities. However, the prior art holographic memory systems may still be improved in storage capacity, efficiency, speed, resistance to radiation, etc.

SUMMARY OF THE INVENTION

An advanced holographic memory technology enables high-density and high-speed holographic data storage with random access during data recording and readout. Embodiments of the invention provide two electro-optic beam steering schemes: one utilizing a liquid crystal (LC) beam steering device and the other utilizing a MEMS mirror scanner (Micro-Electro-Mechanical Systems).

Embodiments of the invention may utilize two LC beam steering spatial light modulators cascaded in an orthogonal configuration to form a two dimensional angular-fractal multiplexing scheme. Alternatively, the MEMS mirror may scan a reference beam (split from a single collimated laser beam) along a horizontal plane in parallel with a C-axis. Further, the MEMS mirror may be varied by small increments with respect to each new data page to specifically orient the reference beam to the photorefractive crystal (which is used to store the holograms) in an angular multiplexing scheme.

In addition, the system may be implemented in a CD-size holographic memory breadboard. An architecture of the invention may also provide for using a single collimated laser beam to both write to and read from the storage device (e.g., the photorefractive crystal). Such a single laser beam configuration is distinguishable from the prior art configurations which normally require multiple different laser diodes/sources. Further, embodiments may also utilize a key Fe:LiNbO$_3$ photorefractive crystal as the storage means. Such a storage means has shown significant radiation resistance performance. One or more embodiments of the invention may also be used/configured for use with both analog and digital holograms.

BRIEF DESCRIPTION OF THE DRAWINGS

Referring now to the drawings in which like reference numbers represent corresponding parts throughout:

FIG. 13 is a flow chart that illustrates a method for storing data in holographic memory in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Holographic Data Storage

As described above, holographic data storage may store data in a large number of holograms inside of a photorefractive crystal. Holograms may be formed by recording (in a cubic photorefractive crystal) the light interference pattern caused by a data beam carrying page data (image or binary bits) and a reference laser beam. Since these images are stored in the Fourier domain and recorded in three dimensions, massive redundancy is built into the holograms such that the stored holograms would not suffer from imperfections in the media or point defects.

The LiNbO$_3$ photorefractive crystal has been the most mature recording material for holographic memory due to its uniformity, high electro-optical coefficient, high photon sensitivity, and commercial availability. One unique advantage for using holographic data storage is its rad hard (radiation hardened) capability. Holograms stored in photorefractive crystal have been experimentally proven to be radiation resistant. For example, when a Lithium Niobate holographic memory was flown in space, the retrieved crystals only suffered surface damage and still retained their photosensitivity for hologram recordings.

Compact Holographic Memory Using Beam Steering

The key to achieve high-speed data transfer rates in a holographic memory system is the laser beam steering methodology. Various methods/systems may be used to improve the speed using beam steering.

Liquid Crystal Beam Steering Devices

Figure 1:
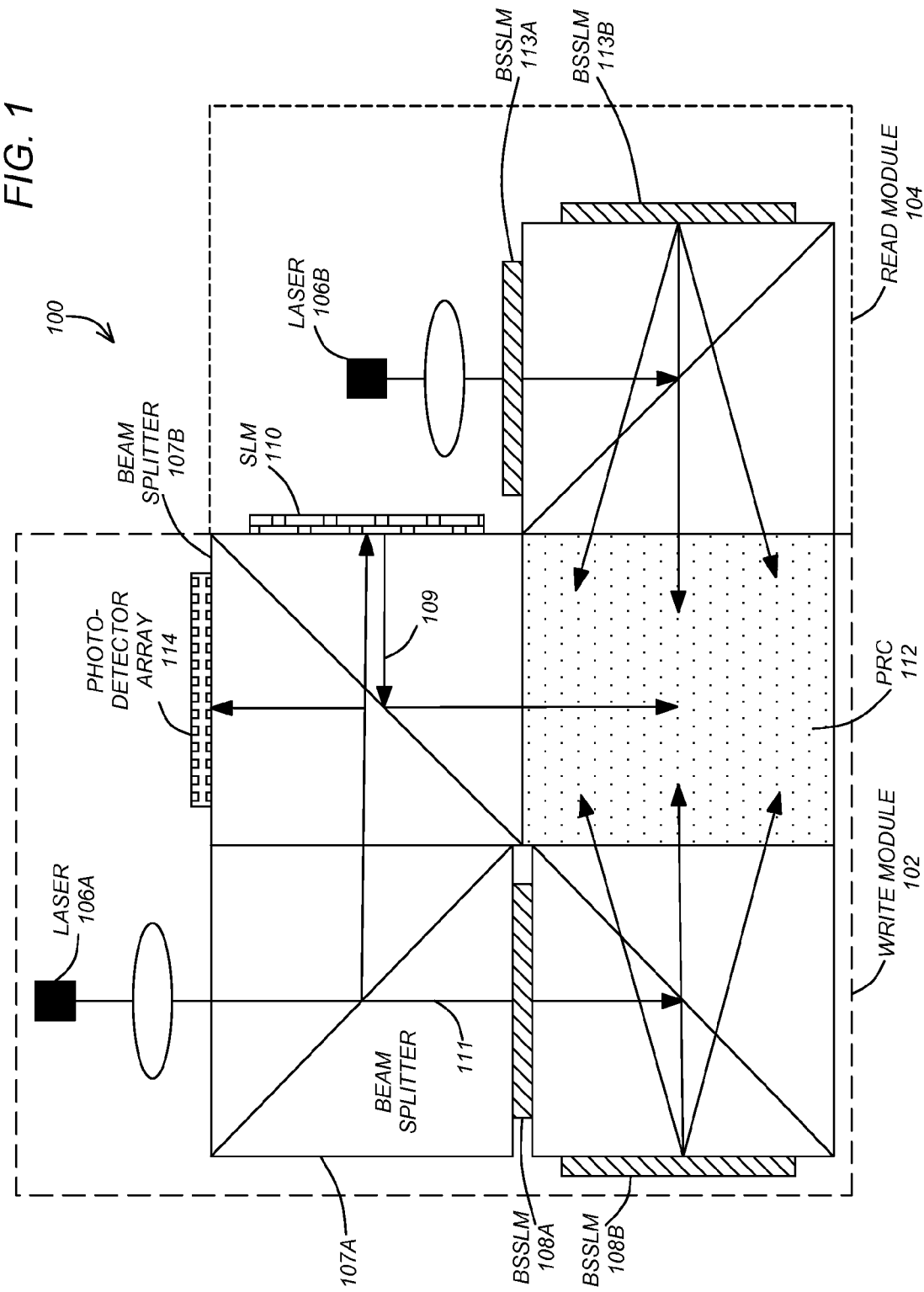
FIG. 1 illustrates a schematic architecture that utilizes a liquid crystal BSSLM in accordance with one or more embodiments of the invention.

In accordance with one or more embodiments of the invention, a liquid crystal beam steering spatial light modulator (BSSLM) is used for high-speed beam steering. FIG. 1 illustrates a schematic architecture that utilizes a liquid crystal BSSLM in accordance with one or more embodiments of the invention. The architecture 100 consists of a writing module 102 for multiple hologram recordings and a readout module 104 for hologram readout.

The writing module 102 includes a laser diode 106A as the coherent light source, a pair of cascaded BSSLMs 108, one transmissive 108A and one reflective 108B in each pair, for angular multiplexed beam steering, a data SLM 110 for data input for storage, two cubic beam splitters 107A and 107B for beam forming, and a photorefractive crystal 112 for hologram recording.

The readout module 104 also shares the photorefractive crystal 112. The readout module includes a laser diode 106B with the same wavelength as the writing laser diode 106A, a pair of cascaded BSSLMs 113A and 113B to generate phase conjugated readout beams (i.e., the readout beam is directed opposite to the writing beam), the shared photorefractive crystal 112, a cubic beam splitter, and a photodetector array 114 for recording the readout holograms. The system uses an angular multiplexing scheme to store multiple holograms and phase-conjugated beams to read out each hologram.

In hologram writing, the collimated laser beam 106A splits into two parts at the first cubic beam splitter 107A. The horizontally deflected light travels across the second cubic beam splitter 107B to read out the input data after impinging upon the data SLM 110. The data carrying beam 109 is then reflected into the PR crystal 112 as the data writing beam.

The remaining part of the laser beam 111 travels vertically, passing a BSSLM 108A and is then reflected to the second reflective BSSLM 108B. Both BSSLMs 108 are 1-dimensional blazed phase gratings capable of beam steering with an angular deflection determined by the grating periods. By cascading two BSSLMs 108 in orthogonal, 2-dimensional beam steering can be achieved. Alternatively, a single 2-D beam steering SLM could be used. The deflected laser beam 111 is directed towards the PR crystal 112 to form an interference grating (hologram). Each individual hologram is written with a unique reference angle and can only be read out at this angle (or its conjugated one). By varying the reference beam angle 111 in sequential recording, a very large number of holograms can be recorded in the recording medium.

For hologram readout, an innovative phase conjugation architecture is illustrated in FIG. 1. The phase conjugation scheme enables lensless hologram readout with minimal distortion (low bit error rate). As shown in FIG. 1, a second pair of transmissive 113A and reflective 113B BSSLMs are used to provide a phase-conjugated readout beam (with respect to the writing reference beam). After the beam impinges upon the PR crystal 112, the diffracted beam from the recorded hologram exits the PR crystal 112 back tracking the input data beam path, due to the phase-conjugation property. The beam then directly impinges upon the photodetector array 114 without the need for focusing optics and reconstructing the corresponding data page, as was recorded and stored in the PR crystal 112.

Electro-Optic Beam Steering

Figure 2:
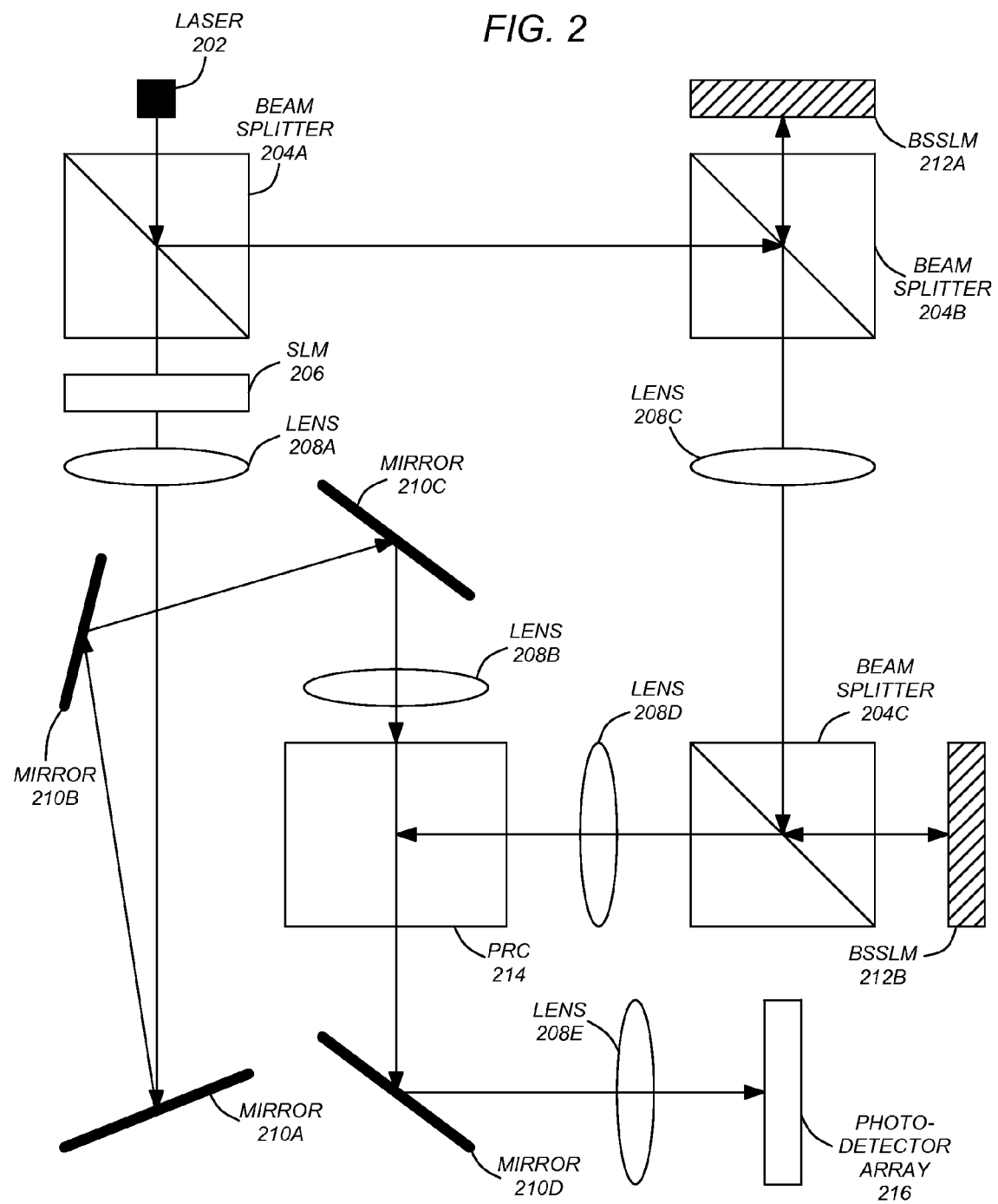
FIG. 2 illustrates electro-optic beam steering in accordance with one or more embodiments of the invention.

In an alternative embodiment of the invention, electro-optic beam steering as illustrated in FIG. 2 may be used. Collimated laser beam 202 first enters the polarizing beam splitter 204A where it is split into two beams. The input beam subsequently passes through the data SLM 206, lens 208A, mirror 210A, mirror 210B, mirror 210C, lens 208B, and then enters the PRC 214 (a Fe:LiNbO$_3$ photorefractive crystal).

The lens pair 208A and 208B will relay the data SLM 206 throughput image onto the PRC 214. The mirror set 210A–210C fold and increase the light path length to make it equal to that of the reference beam.

The reference beam, after exiting the beam splitter 204A, passes through beam splitter 204B, BSSLM 212A, beam splitter 204B (again), lens 208C, beam splitter 204C, BSSLM 212B, beam splitter 204C (again), lens 208D, and arrives at PRC 214.

The data beam and reference beam intersect within the volume of the PRC 214 forming a 90° recording geometry. Both beams are polarized in the direction perpendicular to the incident plane (the plane formed by the reference and signal beams). Lens pair 208C and 208D relay the BSSLM 212A onto the PRC 214 surface. BSSLM 212A scans the reference beam along the horizontal plane (or the x-axis) in parallel with the C-axis. BSSLM 212B steers the reference beam in the vertical plane (y-axis, or the fractal plane). During holographic data recording, the interference pattern formed by each page of input data is recorded in the PR crystal 214. The reference beam angle (and location) is altered with each subsequent page of input data. During readout, the data beam is shut down and the reference beam is activated to illuminate the PR crystal 214.

Due to the principle of holographic wavefront reconstruction, the stored page data, corresponding to the specific reference beam angle, may be read out. The readout data beam exits the PRC 214 and passes through mirror 210D and lens 208E before reaching the photodetector (PD) array 216. Note that the lens set 208A, 208B and 208E relays the input SLM 206 to the PD array 216. The magnification factor, caused by the lens set, is determined by the aspect ratio between the data SLM 206 and the PD array 216.

As depicted in FIG. 2, by using two 1-dimensional BSSLMs 212A and 212B cascaded in an orthogonal configuration, a 2-dimensional angular fractal multiplexing scheme is formed, in a breadboard setup that enables high-density recording and retrieval of holographic data.

In experiments, holograms were first multiplexed with x-direction (in-plane) angle changes while y-direction angle hold unchanged. After finishing the recording of a row of holograms, the y-direction was changed (perpendicular to the incident plane) angle, and the next row of holograms was recorded with x-direction angle changes. Both x and y angle changes are fully computer controlled and can be randomly accessed. Accordingly, the recording and retrieval of long video clips of high quality holograms may be conducted.

Advantages of the use of an electro-optic beam steering scheme may include the absence of mechanical motion, high-transfer rate (1 Gb/sec), random access data addressing, low-volume, and low power.

Beam Steering Spatial Light Modulator

The BSSLMs described above may be implemented in a device built upon a VLSI back plane in a ceramic PGA (pin grid array) carrier. A 1-dimensional array of 4096 pixels, filled with nematic twist liquid crystal (NTLC), is developed on the SLM (spatial light modulator) surface. The device aperture is of the size of 7.4 µm×7.4 µm, each pixel is of 1.18 µm×7.4 µm in dimension. The response time of such an embodiment may reach 200 frames/sect.

Further, the NTLC in the above embodiments may be replaced with Ferroelectric Liquid Crystal (FLC). The use of FLC may increase the speed by one order of magnitude (i.e., >2000 frames/sec).

Figure 3:
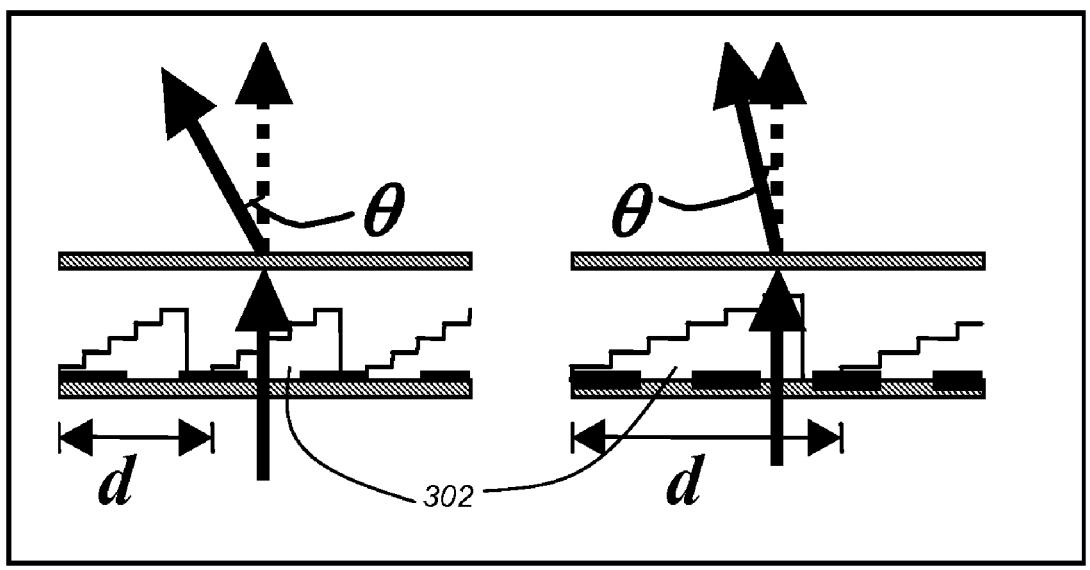
FIG. 3 illustrates beam steering using a phase modulation SLM with a variable grating period in accordance with one or more embodiments of the invention.

The principle of operation of such a BSSLM is illustrated in FIG. 3. FIG. 3 illustrates beam steering using a phase modulation SLM with a variable grating period. Since the SLM is a phase-modulation device, by applying proper addressing signals, the optical phase profile 302 (i.e., a quantized multiple-level phase grating) would repeat over a 0-to-2π ramp with a period d. The deflection angle θ of the reflected beam is inversely proportional to d:

$$\theta = \sin^{-1}(\lambda/d)$$

where $\lambda$ is the wavelength of the laser beam. Thus, beam steering can be achieved by varying the period of the phase grating.

For example, if each period d consists of 8 phase steps each with 1.8 µm pixel pitch. The period d will be 14.4 µm. With the operating wavelength at 0.5 µm, the total beam steering angle will be about +/−3.2°. The total angle of diffraction will be 6.4°. In the next development step, the pixel pitch can be reduced by 0.5 µm and the corresponding total beam steering angle will be increased to 22.5°.

The diffraction efficiency, η, of this device is:

$$\eta = \left(\frac{\sin(\pi/n)}{\pi/n}\right)^2$$

Where n: number of steps in the phase profile. For example η~81% for n=4, and η~95% for n=8.

Figure 4:
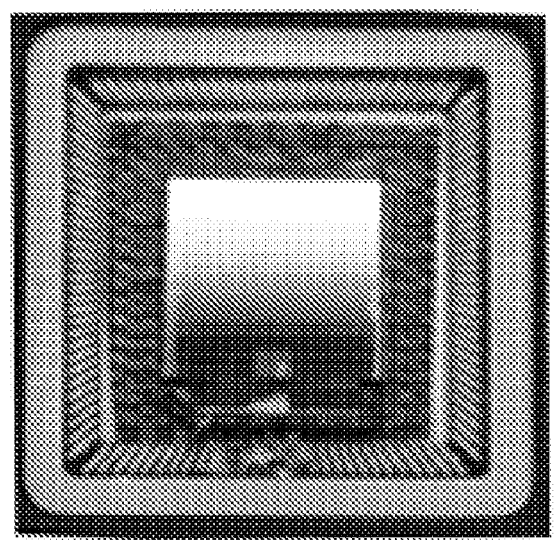
FIG. 4 is a photograph of an example liquid crystal BSSLM and a magnified view of the grating structure of the SLM in accordance with one or more embodiments of the invention.

The number of resolvable angles of the steered beam can be defined by:

$$M = 2m/n + 1$$

Where m is the pixel number in a subarray, and n is the minimum number of phase steps used. For example, the number resolvable angle M of a 4096 array (i.e. m=4096) with of 8 phase levels (i.e. n=8) would be 910. One such device may be configured into eight 1×512 subarray due to the resolution limits of the foundry process. Therefore there may only be 129 resolvable angles are available for a BSSLM. A photo of an example liquid crystal BSSLM and a magnified view of the grating structure of the SLM is shown in FIG. 4.

As described above, some advantages of using such a electro-optic beam steering device for angular multiplexing for holographic data storage include, no mechanical moving parts, randomly accessible beam steering, low voltage/power consumption, large aperture operation, and no need for bulky frequency-compensation optics as in AO based devices.

Figure 5A:
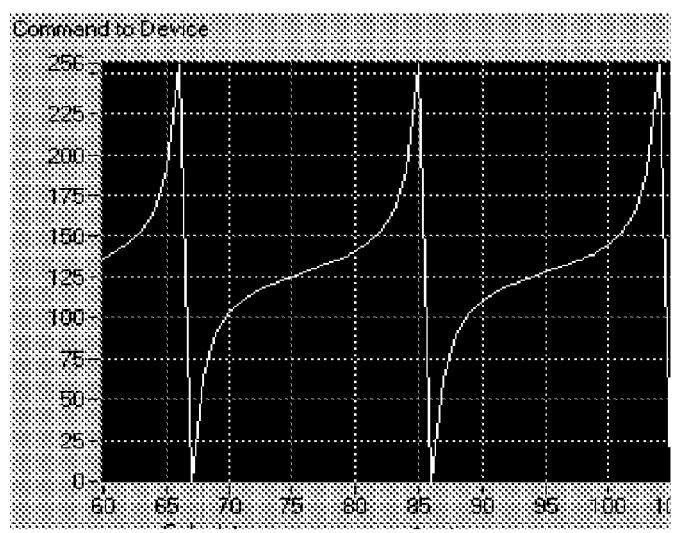
FIG. 5A shows an example of a driving voltage waveform profile that may be used to achieve a very high diffraction efficiency (>80%) for a steered beam in accordance with one or more embodiments of the invention.
Figure 5B:
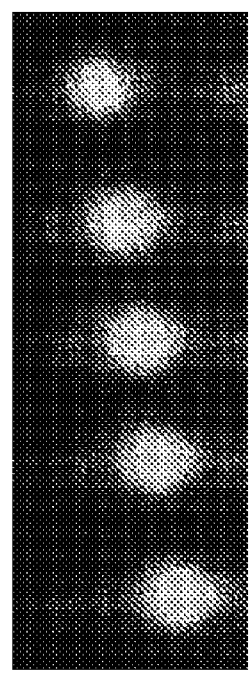
FIG. 5B illustrates an example of a beam steering trace recorded using a BSSLM in accordance with one or more embodiments of the invention.

In addition to the above, a custom phase-array profile driver may be used with a LabView™ based system HW/SW controller for the downloading of a driving profile to the BSSLM. FIG. 5A shows an example of a driving voltage waveform profile that may be used to achieve a very high diffraction efficiency (>80%) for the steered beam. A sample of beam steering trace recorded using the BSSLM is shown in FIG. 5B.

Holographic Memory Storage Capacity and Transfer Rate

Various different sizes and types of devices may be used in accordance with embodiments of the invention.

For example, it has been demonstrated that up to 160,000 pages (i.e. 160 Gbs of memory) of hologram can be stored in a $LiNbO_3$ PR crystal with 1 $cm^3$ volume using a scanning mirror to create angular multiplexing for each reference beam. However, the scanning mirror scheme that requires mechanically controlled moving parts is not suitable for space flight. Accordingly, one or more embodiments of the invention may provide an all electro-optic controlled angular multiplexing scheme with high-speed and high resolution. In this regard, as described above, the invention may utilize an all-phase beam steering device, the BSSLM.

Both transmissive and reflective BSSLMs may be used in an advanced holographic memory (AHM) system. An example of a transimissive BSSLM device is a 1×1024 array with resolvable spots about 64. An example of a reflective BSSLM device is a silicon-based 1-D diffractive beam steering device. Such a reflective BSSLM device may be a 1×4096 array, that has approximately 128 resolvable spots. Devices with a higher number of resolvable spots (around 180) may also be provided in accordance with embodiments of the invention. Thus, total resolvable spots from cascaded BSSLMs may be around 11,520. By using two cascaded BSSLMs for beam steering, a total of more than 10,000 pages of hologram can be stored and readout in a single cubic centimeter of PR crystal. Since each page can store about 1000×1000 pixels of data (1 Mbytes), the total storage capacity can reach 10 Gigabytes.

In another example, a 1×4096 array may be used with an aperture size of 7.4 mm×7.4 mm. Alternatively, the array size may be expanded to 2.5 mm×2.5 mm (1 $in^2$) and the corresponding array density would be 1×12000. Thus, the number of resolvable angles would be increased to 2666.

From the above information, it may be seen that the Liquid Crystal BSSLM utilized in a holographic memory setup of the invention may be appropriate for high-density holographic storage. With additional upgrades in BSSLM performance, the total number of the holograms that can be recorded in a holographic memory breadboard may easily exceed 20,000. Such a holographic breadboard may be configured by recording 2000 holograms in each x-dimension row (i.e. the angular direction) and 10 rows in y-dimension (i.e. the fractal direction).

The storage capacity of such a holographic memory system, with using the upgraded electro-optic BSSLM, would then exceed 20 Gb for a 1000 pixel×1000-pixel input page. It would further increase to 500 Gb by using a 5000 pixel×5000 pixel input page. Further miniaturization would make enable the reduction of the holographic memory into a 5 cm×5 cm×1 cm cube. By stacking a multiple of such holographic memory cubes on a memory card (e.g. 10×10 cubes on each card), a storage capacity of 2–50 Tb per card may be achieved. The transfer rate of such a holographic memory system may range from 200 Mb/sec (200 pages/sec, with a 1 M pixel page) to 5 Gb/sec (200 pages/sec, with a 25 M pixel page).

Figure 6:
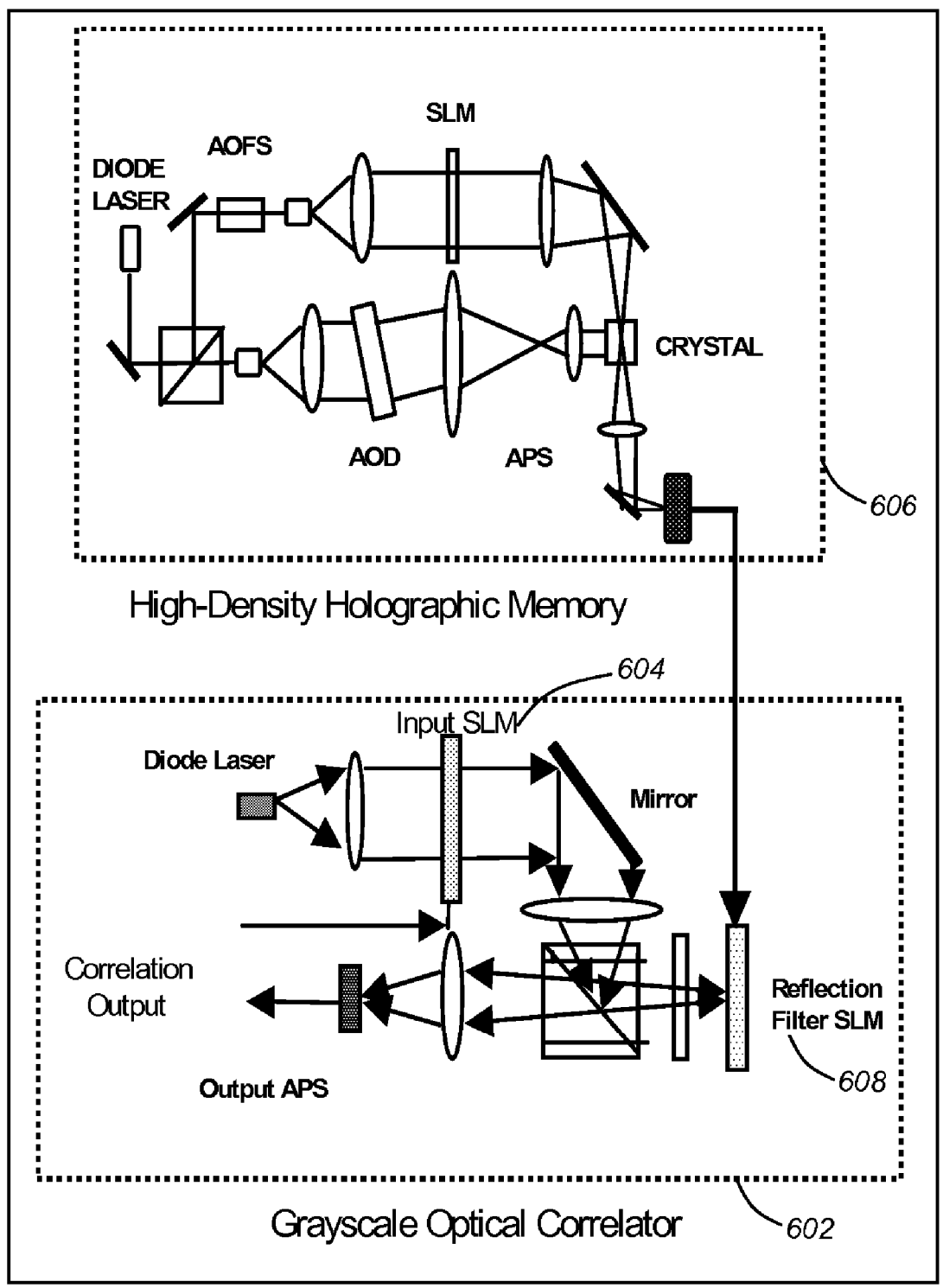
FIG. 6 illustrates a system architecture of an optical correlator using holographically stored and retrieved filter data for real-time optical pattern recognition in accordance with one or more embodiments of the invention.

Applying Advanced Holographic Memory (AHM) Technology to Support Massive Storage Needs of Optical Patterns The AHM technology may support the massive data storage needs of an optical pattern recognition system. In this regard, gray scale optical correlators have been extensively developed and applied for pattern recognition. The invention provides a compact grayscale optical correlator (GOC) 602 for real-time automatic target recognition (ATR). As shown in FIG. 6, such an optical correlator 602 may employ a Liquid Crystal Spatial Light Modulator (LC SLM) 604, with 8-bit grayscale resolution for input incoherent-to-coherent image conversion. FIG. 6 illustrates a system architecture of an optical correlator 602 using holographically stored and retrieved filter data for real-time optical pattern recognition. The readout data containing grayscale MACH (maximum average correlation height) filter data from a high-density holographic memory 606 is directly fed into the filter SLM driver 608 of a GOC 602 to enable real-time ATR.

In the Fourier transform plane, a bipolar-amplitude (i.e. real-valued) SLM may be used to encode the correlation filter. The real-valued correlation filter encoding capability has enabled the use of a very powerful optimum filter computation algorithm, Maximum Average Correlation Height (MACH), for distortion invariant correlation computation.

One of the major limitations for more versatile ATR using this GOC 602 is the severe limitation size limitation of electronic memory. Such a GOC 602 is capable for updating the correlation filter at a rate of 1000 frames/sec. Each filter consists of 512-pixel×512-pixel with 8-bit grayscale resolution. Thus, to operate the correlator 602 at full speed, the filter data throughput will be at 2 Gigabit/sec. This transfer rate is far beyond that of magnetic hard disk. Only SDRAM could be used with adequate data transfer rate. However, to save a modest number of 1000 filters on-board, it would need two Gigabits of SDRAM memory. The memory board size and power consumption is too excessive for many air and space-borne systems to accommodate. Therefore, the invention utilizes holographic memory 606 as an alternative memory solution for real-time pattern recognition using a GOC 602.

Unique advantages of using holographic memory system for updatable optical correlator applications including high storage density, random access, high data transfer rate, and grayscale image storage capability. All these three characteristics very well meet the memory requirements of a GOC 602.

Experimental Demonstration of Optical Pattern Recognition Using Optical Correlator With Holographic Memory As described above, one or more embodiments of the invention utilize a portable GOC with optically implemented MACH (maximum average correlation height) correlation filters.

Figure 7A:
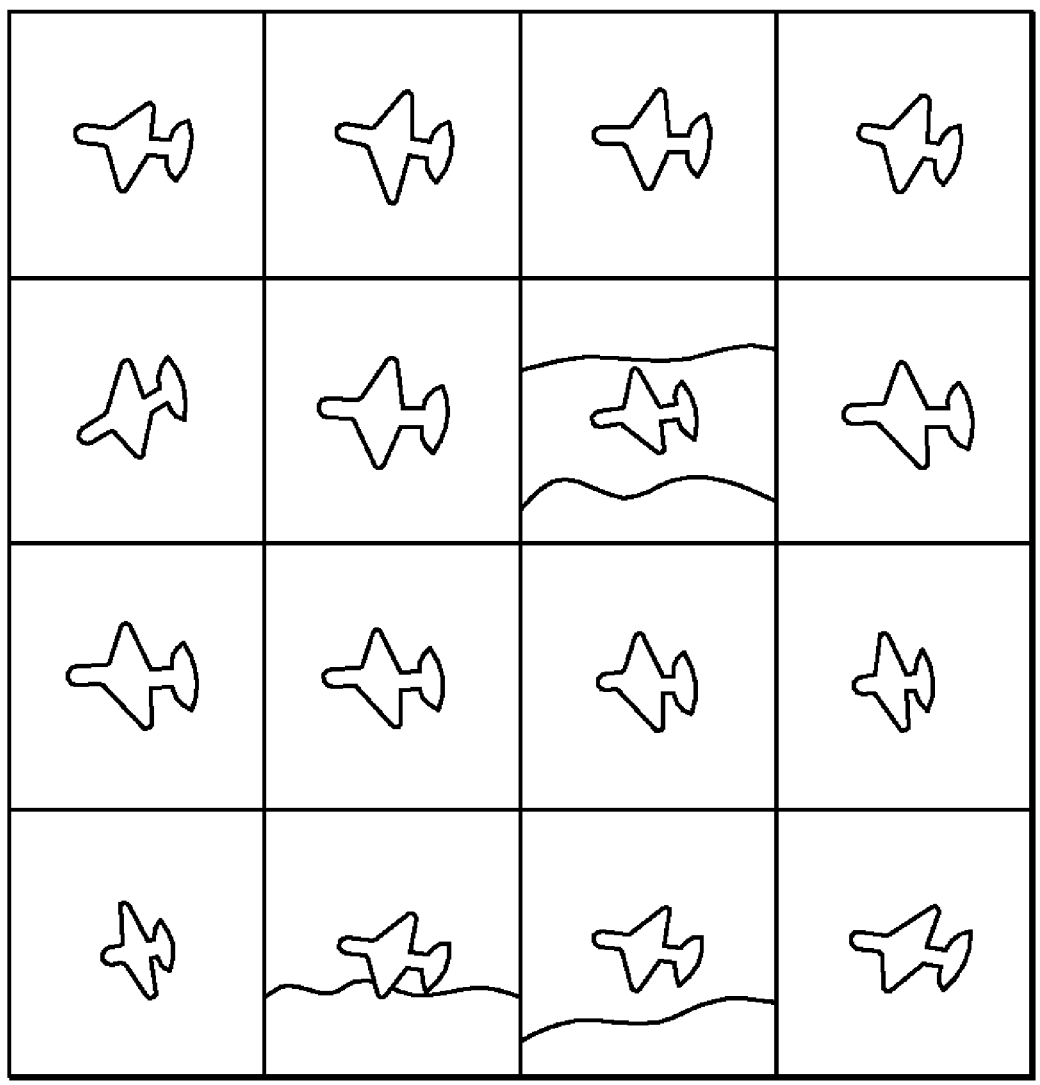
FIG. 7A illustrates a set of training images selected for developing MACH correlation filters in accordance with one or more embodiments of the invention.
Figure 7B:
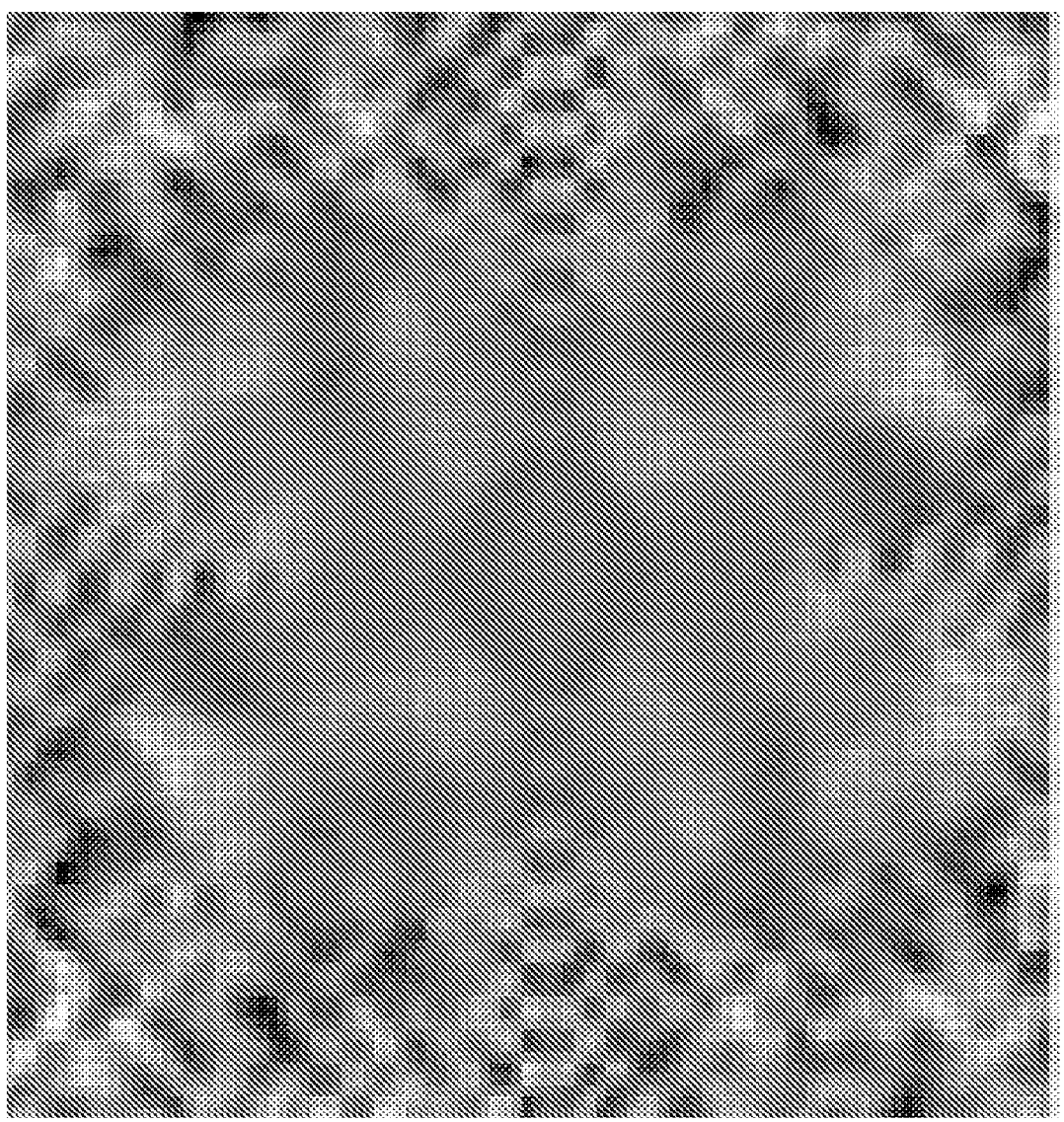
FIG. 7B illustrates the image of one of the developed MACH filters (with 8-bit dynamic range) in accordance with one or more embodiments of the invention.

An experimental demonstration has illustrated real-time optical pattern recognition. During such an experimental test, a camcorder-sized GOC may be used to perform real-time pattern recognition. A CHDS (compact holographic data storage) breadboard may be used to store and readout MACH correlation filters. The experimental steps may be described as follows. First, a set of training images, as shown in FIG. 7A, may be selected for developing MACH correlation filters. The image of one of these MACH filters (with 8-bit dynamic range) to be stored and retrieved from a holographic memory system is shown in FIG. 7B. Second, these MACH filters may be recorded into a CHDS breadboard and subsequently readout and downloaded into a filter driver of the GOC. The dynamic range of the retrieved holographic filter image may then be carefully preserved to retain the 8-bit resolution.

For real-time optical pattern recognition operation, a large bank of MACH correlation filter data would be first stored in an acousto-based holographic memory 606 as shown in FIG. 6. The readout holographic data would then be directly fed into the filter SLM driver 608 of the GOC 602 to support the high-speed filter updating needs.

Figure 8:
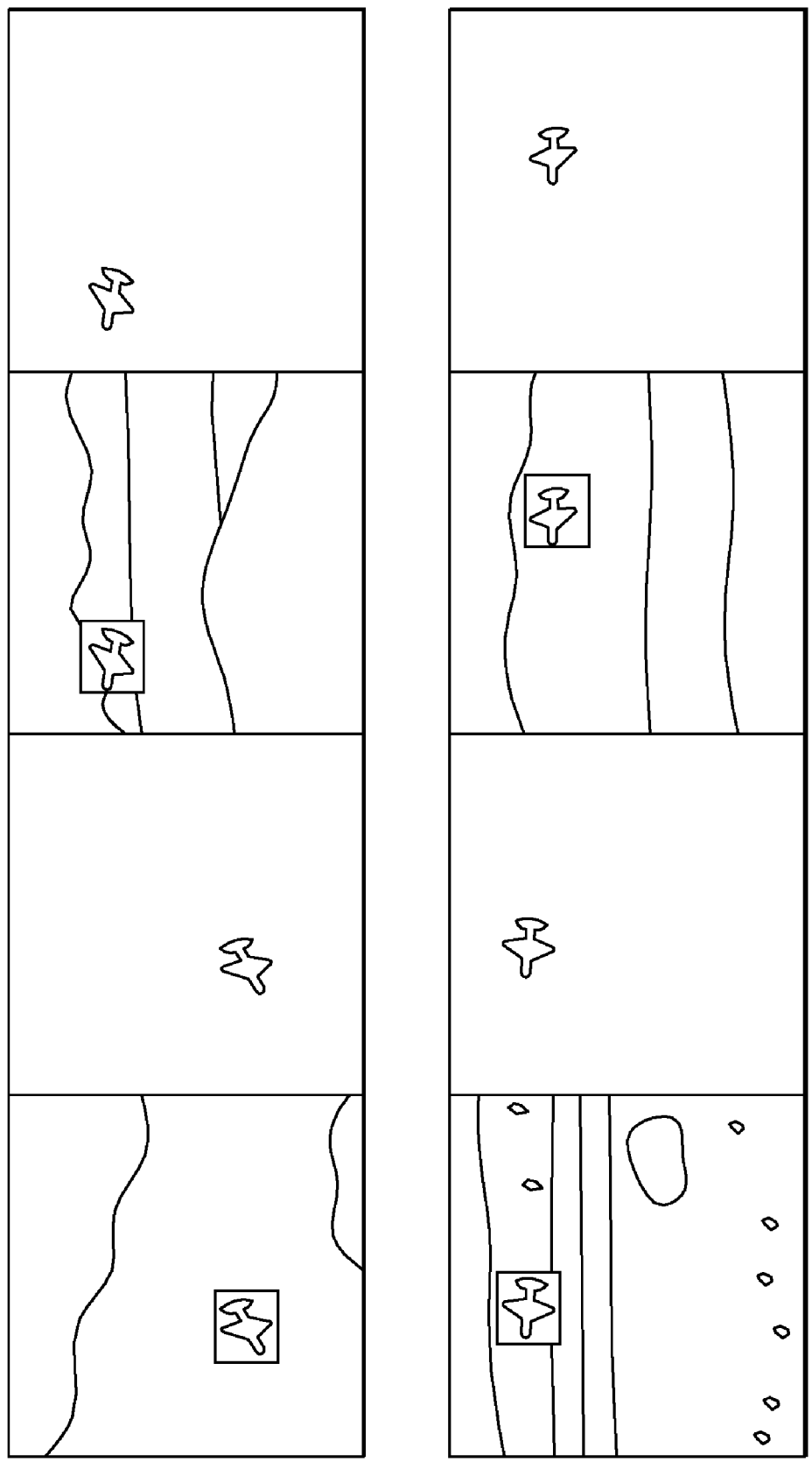
FIG. 8 illustrates experimental results of pattern recognition of a test flight vehicle obtained using a holographically stored MACH filter in accordance with one or more embodiments of the invention.

After the holographically retrieved MACH filter image is downloaded into the filter SLM 608 of the GOC 602, a video of input scene recorded from a previous flight test, may be fed into the input SLM 604. Sharp correlation peaks associated with the input target in various rotations, scale and perspective may be successfully obtained from the correlation output. Some of the correlation output results are displayed in FIG. 8.

Holographic Memory Breadboard with 1D and 2D Electro-Optic Beam Steering

Figure 9A:
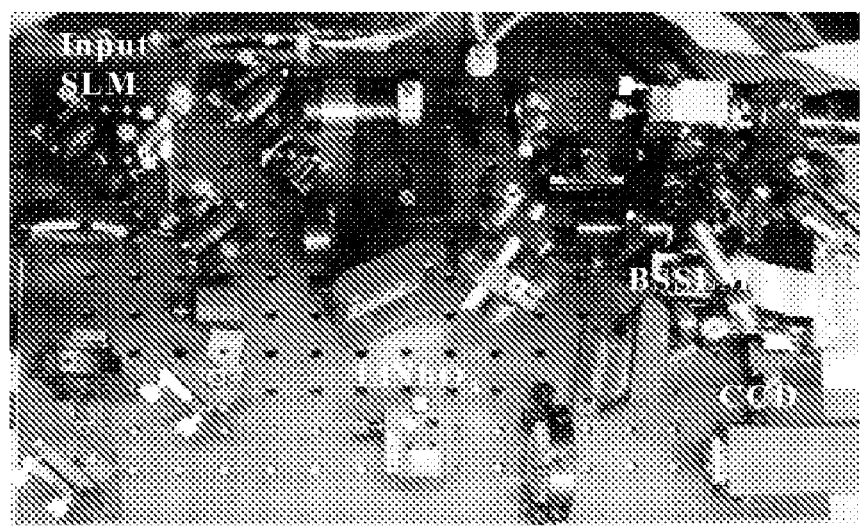
FIG. 9A is a photograph of a book-sized 1-D holographic memory breadboard in accordance with one or more embodiments of the invention.

One or more embodiments of the invention may be implemented in a book-sized 1-D holographic memory breadboard as illustrated in FIG. 9A. Such an implementation may demonstrate the feasibility of using a BSSLM device for beam steering to meet the multiplexing needs during holographic data recording and retrieval. Further, such a system may utilize a single BSSLM and can demonstrate 1D beam steering for angular multiplexing. In addition to the above, a typical such system may measure 30 cm×20 cm×5 cm, the size of a phone book.

Figure 9B:
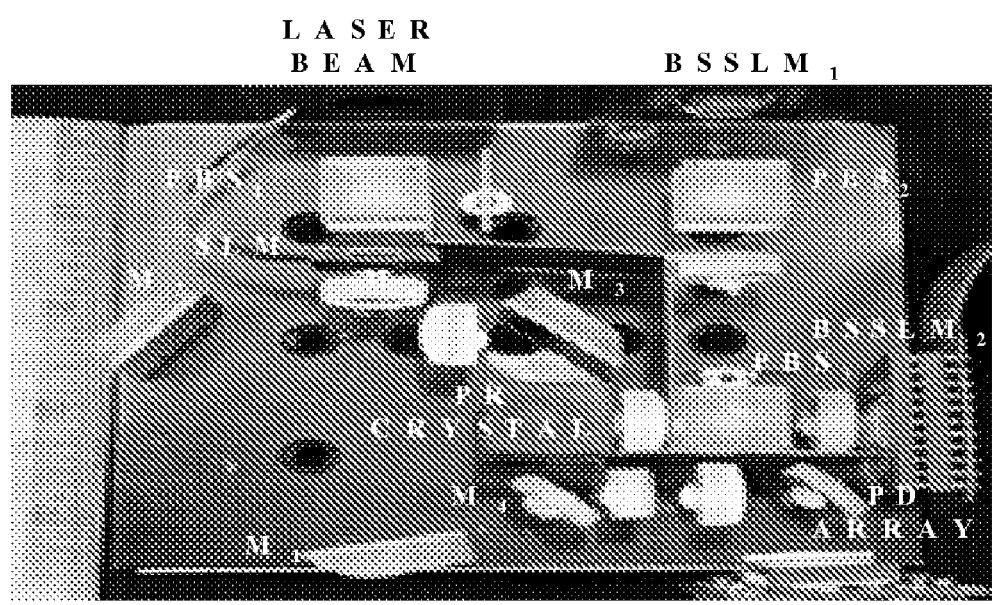
FIG. 9B–9D are photographs of a CD-sized compact holographic memory breadboard with 2D electro-optical angular-fractal beam steering as illustrated in accordance with one or more embodiments of the invention.
Figure 9C:
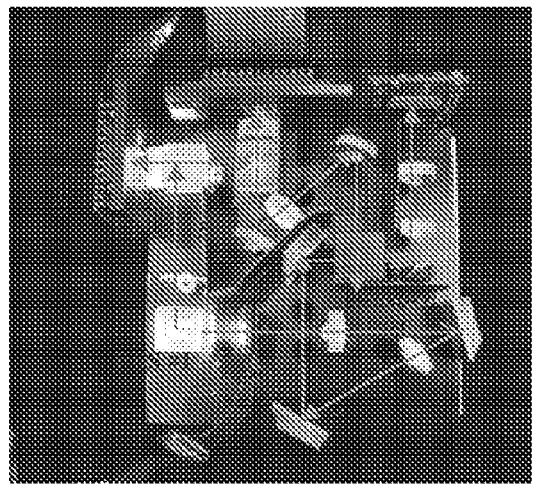
Figure 9D:
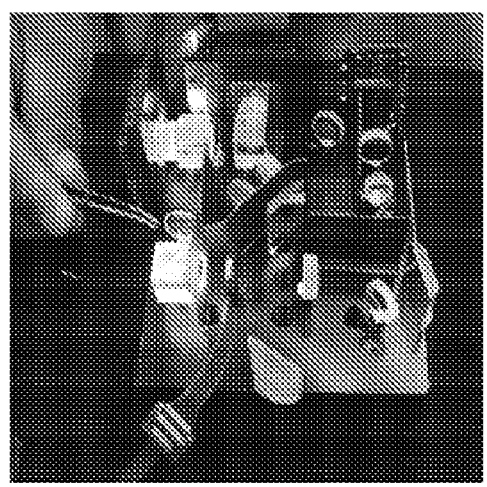

Alternatively, embodiments may be implemented in a CD-sized compact holographic memory breadboard with 2D electro-optical angular-fractal beam steering as illustrated in FIGS. 9B–9D. Such a CD-sized holographic memory breadboard is a very compact holographic memory module, measuring 10 cm×10 cm×1 cm. The compact size of the VLSI based BSSLM together with advanced optics design enables a drastic reduction in the system volume from book-size to CD-size. Such a breadboard is capable of recording 10 GB of holographic data. Further, the system design makes it possible for easy replacement of key devices when an upgraded version becomes available. Such key devices include the Spatial Light Modulator, the BSSLM, and the PD (photodetector) array. Moreover, the system storage capacity may increase by up to 2 orders of magnitude with the use of a high-resolution BSSLM.

The CD-sized holographic memory breadboard may be developed with a comprehensive LabView™ based system controller. Hence, autonomous data recording and retrieval is available upon full integration of the system.

Figure 9E:
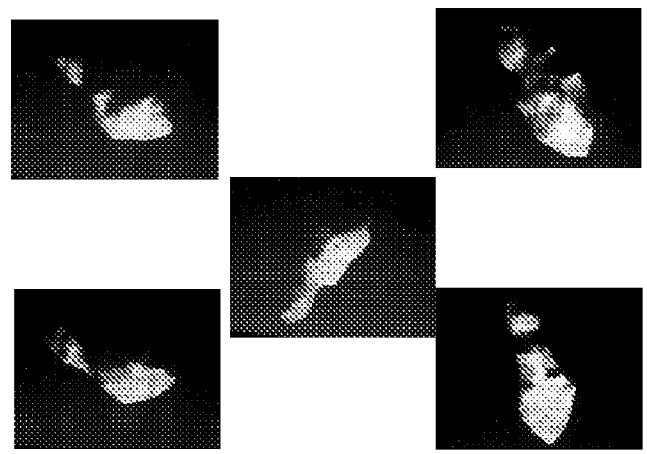
FIG. 9E is a photograph that illustrates the use of the grayscale Toutatis Asteroid image sequence for benchmark testing in accordance with one or more embodiments of the invention.

FIG. 9E illustrates the use of the grayscale Toutatis Asteroid image sequence for benchmark testing (i.e., during data storage test and evaluation). Some examples of the retrieved holographic images of the Toutatis asteroid, excerpted from a long recorded video clip, are shown in FIG. 9E.

Thus, as described above, an advanced holographic memory technology may be used to enable high-density and high-speed holographic data storage with random access during data recording and readout. An innovative E-O (electro-optical) beam steering scheme, achieved by utilizing a liquid crystal beam steering device has been shown. Further, a CD-sized holographic memory breadboard may be integrated and used for successful holographic data recording and retrieval. Such a breadboard is compact with a storage capacity range from 10 Gb to 250 Gb, depending on the input page size.

MEMS Mirror for High-Speed Beam Steering

Although the liquid crystal (LC) BSSLM phase array has been successfully utilized for high-speed beam steering in a compact holographic memory breadboard, it would be beneficial to improve the light throughput efficiency. Due to the light diffraction of the throughput light beams by the phase array in a LC BSSLM, there are many diffracted orders (other than the first order of diffracted laser beams) that are used for hologram recording. Since it is very difficult to achieve 100% diffraction efficiency in the first order, a considerable amount of laser beam energy is spread into the zero order and high order of diffraction. The high-order-light beams cause spurious interference that often reduces the signal-to-noise ratio of the recorded holograms.

Therefore, one or more embodiments of the invention provides for a high-speed scanning mirror that utilizes light deflection instead of diffraction as the beam steering device. The prior art illustrates the use of galvanometer controlled mirrors for laser beam steering applications. However, the considerable mass of the galvanometer mirror may severely limit its scanning speed (e.g. no more than video rate). In view of the limitations of the prior art, the invention provides for the use of emerging MEMS (Microelectromechanical Systems) mirror technology for high-speed beam steering in a compact holographic memory system.

Micro-Electro-Mechanical Systems (MEMS) is the integration of mechanical elements, sensors, actuators, and electronics on a common silicon substrate through microfabrication technology. While the electronics are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices.

MEMS Micro-mirrors are mirrors that have been "shrunk" down to the microscopic world. Such MEMS Micro-mirrors may be used in many ways including application in the field of fiber optics. Alternatively, the MEMS Micro-mirrors may be utilized for beam steering in a holographic memory system.

The fabrication method for these micro-mirrors is similar (or identical) to that of a cantilever structure except that after the process is completed, a reflective layer, such as aluminum, may be placed on top of the beam.

A MEMS micro-mirror utilizes electrostatic actuation for mirror steering. Since positive and negative charges attract each other (and like charges repel), if a cantilever can be made to keep a positive charge while placing an alternating positive-negative charge above it, then by electrostatics, the cantilever will resonate up and down.

In view of the above, a MEMS mirror can be attractive as a beam steering device in a holographic memory system. Advantages of using a MEMS mirror as a beam steering device include: high light throughput efficiency (>99% reflectivity), superior beam quality (light reflected from a mirror does not generate spurious diffraction as that of a diffractive beam steering device), low mass and high-speed.

Figure 10A:
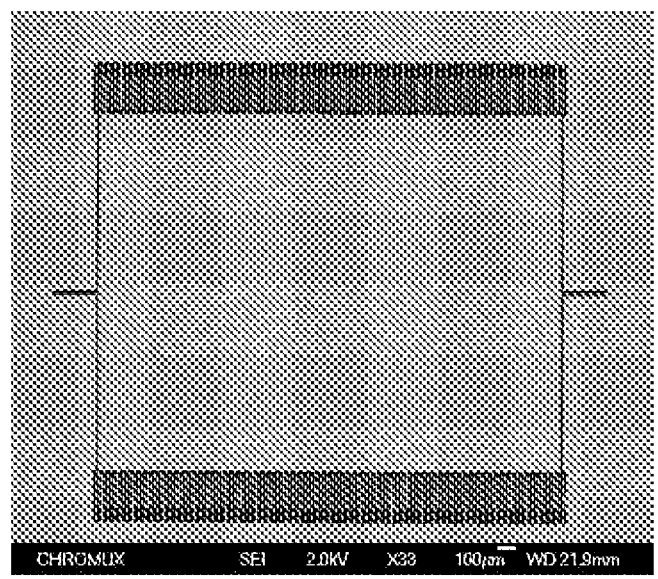
FIGS. 10A–10C illustrate a canidate MEMS mirror, the packaged system, and its corresponding driving voltage respectively in accordance with one or more embodiments of the invention.
Figure 10C:
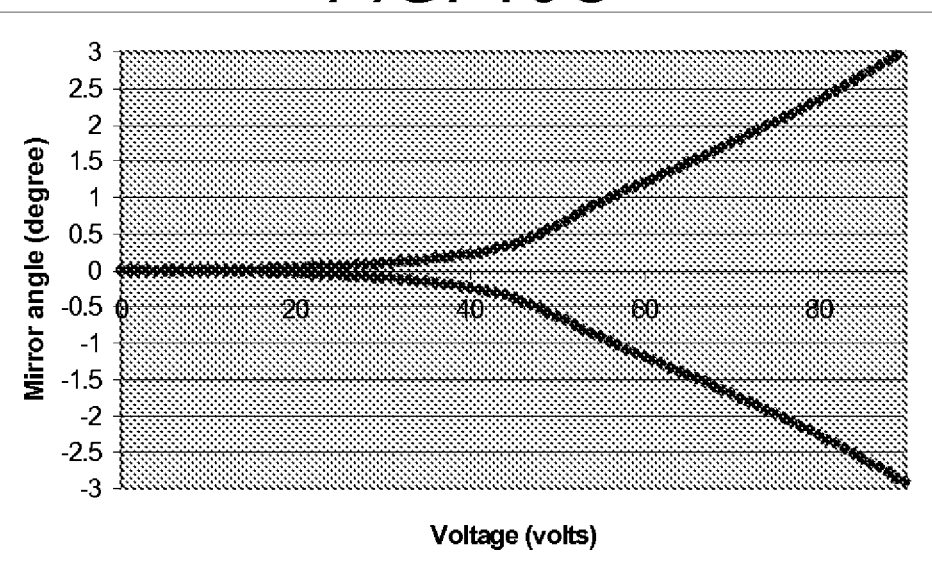
Figure 10B:
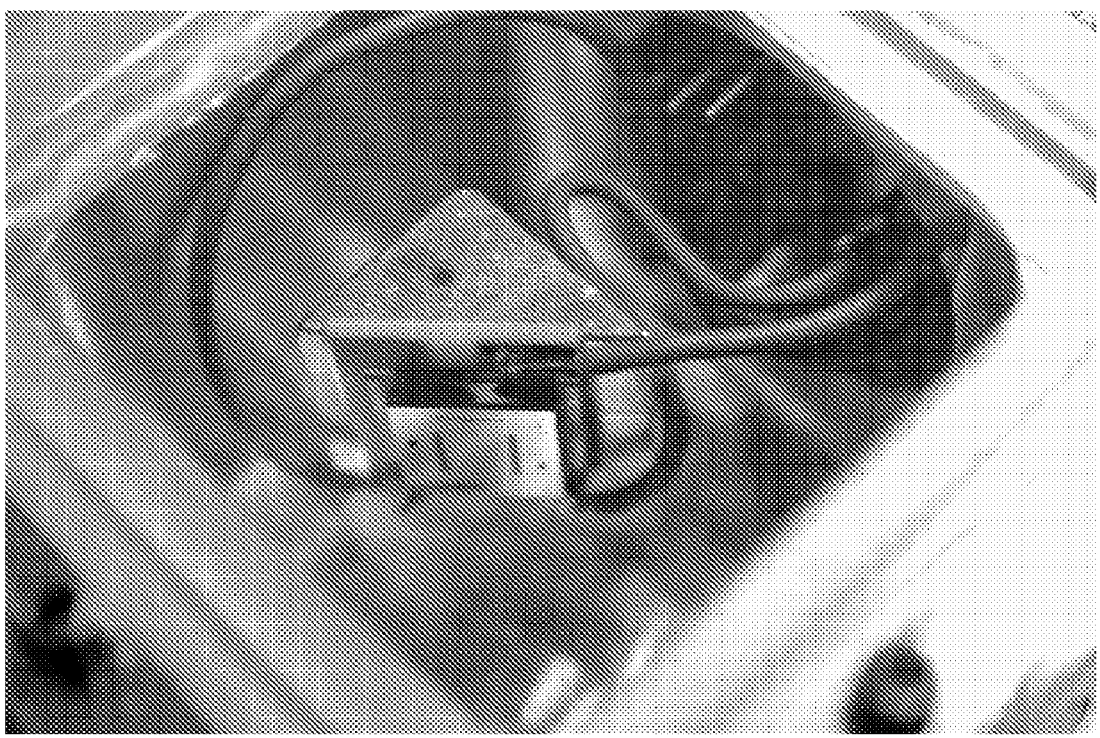

FIGS. 10A–10C illustrate a candidate MEMS mirror, the packaged system, and its corresponding driving voltage respectively in accordance with one or more embodiments of the invention.

Figure 11:
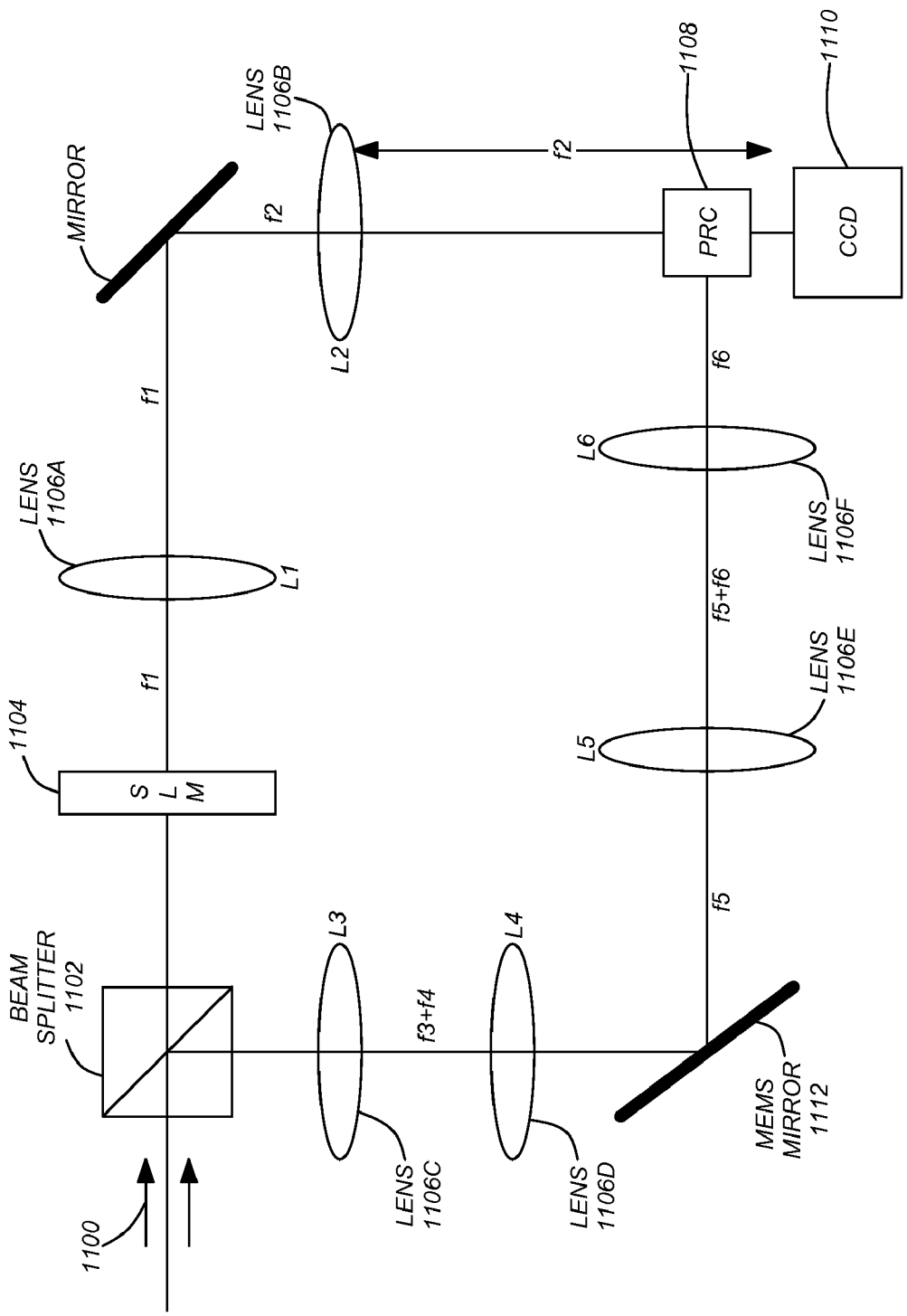
FIG. 11 illustrates a holographic memory system architecture utilizing the MEMS mirror for beam steering in accordance with one or more embodiments of the invention.

The holographic memory system architecture utilizing the MEMS mirror for beam steering is shown in FIG. 11. Details of the system layout provide that a collimated laser beam 1100 first enters a polarizing beam splitter 1102, and on exit is split into two beams. The input beam subsequently passes through the data SLM (spatial light modulator) 1104, and image relaying lens pair 1106A–1106B (also referred to as lens L1 and L2 having focal distances f1 and f2 respectively), then impinges on an Iron doped Lithium Niobate (Fe:LiNbO$_3$) photorefractive crystal (PRC) 1008. The imaging relay lens pair 1106A–1106B is used to scale the imaging size of the input SLM 1104 to match that of the input pupil of the PRC 1108. The imaging relay lens pair 1106A-1106B may also sharply image the input SLM 1104 image onto the recording plane of a CCD 1110 placed behind the PRC 1108.

The PRC 1108 is the holographic recording device capable of large capacity, rewriteable, holographic memory recording. The other beam (i.e. the reference beam) will first pass through the imaging relay lens pair 1106C–1106D (also referred to as lens L3 and L4 respectively) before impinging upon the MEMS mirror 1112. The laser beam will then be deflected by the MEMS mirror 1112 by a pre-determined incremental angle. The deflected reference beam will continue to pass through the third imaging relay lens pair 1106E–1106F (also referred to as lens L5 and L6 respectively) and reach the PRC 1108. The reference beam and the data beam intersect within the volume of the PRC 1108 forming a 90° recording geometry. Focal lengths/distances (e.g., f3+f4) and aperture size of the lens pair 1106C–1106D is selected to compensate the scale difference between the input SLM 1104 aperture and that of the MEMS mirror 1112. Similarly, the lens pair 1106E–1106F feature dimensions (e.g., focal distances f5 and f6) that are selected to match the scale difference between the MEMS mirror 1112 and the PRC 1108 entrance pupil.

The MEMS mirror 1112 scans the reference beam along the horizontal plane (or the x-axis) in parallel with the C-axis. During holographic data recording, the deflected angle from the MEMS mirror 1112 is varied by a small increment with respect to each new data page. Thus, the interference pattern formed between each page of input data beam and the specifically oriented reference beam will be recorded in the PR crystal 1108 in an angular multiplexing scheme.

During readout, the data beam will be shut down and the reference beam will be activated to illuminate the PR crystal 1108. Due to the principle of holographic wavefront reconstruction, the stored page data, corresponding to a specific reference beam angle, will be readout. The readout data beam will be sharply imaged onto the CCD 1110 recording plane.

Radiation Resistance of the Fe:LiNbO$_3$ Photorefractive Crystal

Advanced holographic memories for space applications require not only high-density and high-speed data storage, but also high radiation resistance. Accordingly, due to the inherent redundant nature and radiation self-shielding effect of volume storage, holographic memories may be required to be radiation resistant.

To ensure radiation resistance, various quantitative experimental measurements of the radiation effect of Co$^{60}$ Gamma Radiation on the stored hologram within Fe:LinbO$_3$ PR Crystal may be taken. To conduct the test, a grayscale image may be written into Fe:LiNbO$_3$ crystal. During the recording, this crystal is placed in a precision holder. The crystal holder ensures that hologram readouts from the crystal, before and after the radiation test, are acquired under the same experimental setup parameters. This ensures that any deviation between the two readout hologram images is caused only by the radiation effect.

During gamma irradiation and transportation from one place to another, the crystal may be covered with a thin polyethylene bag to protect against small particles from the air that may deposit on the crystal. Quantitative measurements on the hologram as an image may be performed using specialized software for image analysis. Such a program may allow the selection of the image and the calculation of the integrated density of the image throughput intensity, that is the sum of the gray values in the selection, with background subtracted. Accordingly, the integrated density can be computed using the following formula:

Integrated Density=N*(Mean−Background)

Where N is number of pixels in the selection, and Background is the modal gray value (most common pixel value) after smoothing the histogram. Using the integrated density approach for each irradiated hologram, the radiation hologram alteration parameter plotted in FIG. 12 may be obtained.

Figure 12:
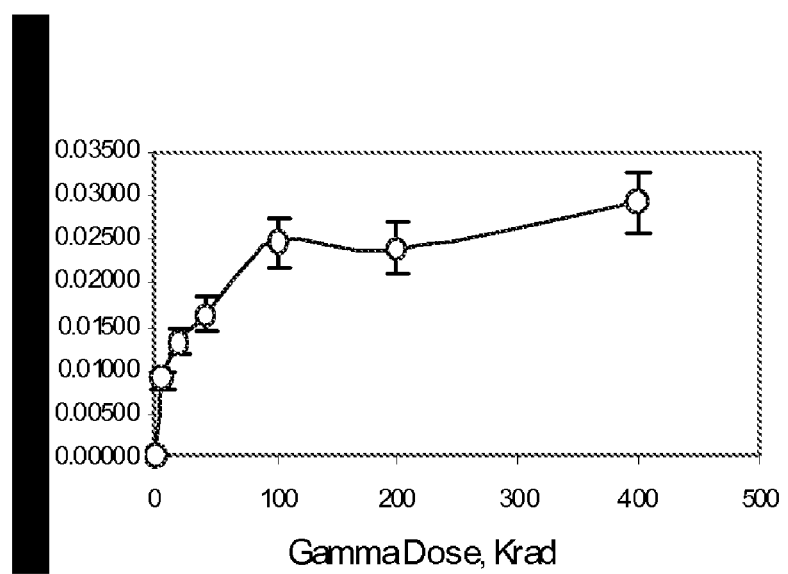
FIG. 12 is a radiation hologram alteration parameter plotted using an integrated density approach for each irradiated hologram in accordance with one or more embodiments of the invention.

As shown in FIG. 12, holographic memory stored in Fe(0.10%):LiNbO3 crystal shows radiation resistance to $Co^{60}$ gamma radiation. Such results illustrate that a hologram recorded in a highly Fe doped crystal, about 0.10% wt. Fe, is affected very little by radiation with a dose up to 400 krad. Further, the maximum change in radiation-altered hologram, $\approx 2.5 \times 10^{-4}$ is reasonably low. Such a preliminary radiation test shows that the Fe:LinbO₃ photorefractive material is at least four times more radiation resistant than its electronic counterpart.

Logical Flow

FIG. 13 is a flow chart that illustrates a method for storing data in holographic memory. At step 1300, a single laser diode emits a collimated laser beam for both writing a hologram to and reading the hologram from a photorefractive crystal. At step 1302, the collimated laser beam is split into a reference beam and an input beam. At step 1304, one or more liquid crystal beam steering spatial light modulators (BSSLMs) or Micro-Electro-Mechanical Systems (MEMS) mirrors are used to steer the reference beam at high speed to the photorefractive crystal. At step 1306, the hologram is stored/recorded in the photorefractive crystal in a form of an interference pattern created by the steered reference beam and the input beam.

In accordance with embodiments of the invention, the BSSLMs may comprise two BSSLMs cascaded in an orthogonal configuration to form a two dimensional angular-fractal multiplexing scheme. Alternatively, the MEMS mirror may steer the reference beam by scanning the reference beam along a horizontal plane in parallel with a C-axis. In this regard, during writing to the photorefractive crystal, the MEMS mirror may be varied by a small increment with respect to each new data page to specifically orient the reference beam to the photorefractive crystal in an angular multiplexing scheme. Further, the components of the system may be implemented/configured in a CD-sized holographic memory breadboard. Additionally, the data may be stored in the hologram in either analog or digital form and the photorefractive crystal may comprise Fe:LiNbO₃ photorefractive material.

CONCLUSION

This concludes the description of the preferred embodiment of the invention. In accordance with embodiments of the invention, an advanced holographic memory technology may be used to enable high-density and high-speed holographic data storage with random access during data recording and readout. Two innovative electro-optical beam steering schemes are described herein: one utilizing a liquid crystal beam steering device, and the other utilizing a MEMS mirror scanner.

The invention also provides a CD-sized holographic memory breadboard that may be used for successful holographic data recording and retrieval. In addition, the invention provides an innovative high-speed beam steering technology using a MEMS mirror. Such a high efficiency, compact MEMS mirror, may further enable the development of an even more compact and high-density holographic memory system.

The invention also illustrates how testing may be performed on Fe:LinbO₃ photorefractive crystal. Gamma radiation tests on a series of the PR crystal may be conducted with different doping concentrations. By identifying the proper doping level the most radiation resistance performance may be explored.

In view the above, the use of either a liquid crystal BSSLM or MEMS mirror to steer the reference beam, the invention utilizes a device that essentially has no moving parts. Such a configuration provides significantly increases the speed for storing/writing and reading holograms stored in the photorefractive material.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A holographic memory system comprising:
   (a) a photorefractive crystal configured to store holograms;
   (b) a single laser diode configured to emit a collimated laser beam to both write a page of data to and read the page of data from the photorefractice crystal;
   (c) a spatial light modulator to encode the page of data on an input beam split from the collimated laser beam;
   (d) a first imaging relay lens pair positioned between the spatial light modulator and the photorefractive crystal to image a spatial light modulator image on a plane behind the photorefractive crystal; and
   (e) one or more liquid crystal beam steering spatial light modulators (BSSLMs) configured to steer a reference beam, split from the collimated laser beam, at high speed to the photorefractive crystal.

2. The system of claim 1, wherein the one or more liquid crystal BSSLMs comprise two BSSLMs cascaded in an orthogonal configuration to form a two dimensional angular-fractal multiplexing scheme.

3. The system of claim 1, wherein the photorefractive crystal, single laser diode, and liquid crystal BSSLMs are implemented in a CD-sized holographic memory breadboard.

4. The system of claim 1, wherein the reference beam and the input beam, obtained from the collimated laser beam, create an interference pattern in the photorefractive crystal to record the hologram.

5. The system of claim 1, wherein the holographic memory system is configured for use with both analog and digital holograms.

6. The system of claim 1 wherein the reference beam impinges on the photorefractive crystal in a collimated form.

7. A method for storing data in holographic memory comprising:
- a single laser diode emitting a collimated laser beam for both writing a page of data to and reading the page of data from a photorefractive crystal;
- splitting the collimated laser beam into a reference beam and an input beam;
- passing the input beam through a spatial modulator to encode the page of data in the input beam;
- passing the input beam through a first imaging relay lens pair for imaging a spatial light modulator image on a plane behind the photoretractive crystal;
- one or more liquid crystal beam steering spatial light modulators (BSSLMs) steering the reference beam at high speed to the photorefractive crystal;
- storing the page of data in the photorefractive crystal in a form of a interference pattern created by the steered reference beam and the input beam.

8. The method of claim 7, wherein the one or more liquid crystal BSSLMs comprise two BSSLMs cascaded in an orthogonal configuration to form a two dimensional angular-fractal multiplexing scheme.

9. The method of claim 7, wherein the photorefractive crystal, single laser diode, and liquid crystal BSSLMs are implemented in a CD-sized holographic memory breadboard.

10. The method of claim 7, wherein data may be stored in the hologram in either analog or digital form.

11. The method of claim 7 further comprising impinging the reference beam on the photorefractive crystal in a collimated form.

12. An apparatus for storing data in holographic memory comprising:
- means for storing one or more pages of data;
- means for emitting a collimated laser beam to both write to and read from the means for storing;
- spatial light modulator means for encoding the page of data on an input beam split from the collimated laser beam;
- means for imaging a spatial light modulator image on a plane behind the means for storing; and
- one or more liquid crystal beam steering spatial light modulators (BSSLMs) configured to steer a reference beam, split from the collimated laser beam, at high speed to the means for storing.

13. The apparatus of claim 12, wherein the one or more liquid crystal BSSLMs comprise two BSSLMs cascaded in an orthogonal configuration to form a two dimensional angular-fractal multiplexing scheme.

14. The apparatus of claim 12, wherein the means for storing the hologram, means for emitting a collimated laser beam, and the one or more liquid crystal BSSLMs are implemented in a CD-sized holographic memory breadboard.

15. The apparatus of claim 12, wherein the reference beam and the input beam, obtained from the collimated laser beam, create an interference pattern in the means for storing the hologram to record the hologram.

16. The apparatus of claim 12, wherein the apparatus is configured for use with both analog and digital holograms.

17. The apparatus of claim 12 further comprising the reference beam impinging on the means for storing in a collimated form.

* * * * *